United States Patent [19]

Kiekens et al.

[11] Patent Number: 5,691,126
[45] Date of Patent: Nov. 25, 1997

[54] CLASS OF YELLOW DYES FOR USE IN PHOTOGRAPHIC MATERIALS

[75] Inventors: Eric Kiekens, Zele; Antonius Van Gils, Meer; Roland Claes, Dendermonde, all of Belgium

[73] Assignee: Agfa-Gevaert, N.V., Mortsel, Belgium

[21] Appl. No.: 705,523

[22] Filed: Aug. 29, 1996

Related U.S. Application Data

[60] Provisional application No. 60/007,974, Dec. 05, 1995.

[30] Foreign Application Priority Data

Oct. 16, 1995 [EP] European Pat. Off. ............ 95202788

[51] Int. Cl.$^6$ ............................................. G03C 1/83
[52] U.S. Cl. ..................... 430/522; 430/580; 430/594
[58] Field of Search .................................. 430/522, 580, 430/594, 595

[56] References Cited

U.S. PATENT DOCUMENTS

| | | | |
|---|---|---|---|
| 3,615,546 | 10/1971 | Depoorter et al. | 430/522 |
| 3,984,247 | 10/1976 | Nakamura et al. | 430/522 |
| 4,311,787 | 1/1982 | Lemahieu et al. | 430/522 |
| 4,830,950 | 5/1989 | Kuwabara et al. | 430/522 |
| 4,857,446 | 8/1989 | Diehl et al. | 430/522 |
| 5,344,749 | 9/1994 | Kiekens et al. | 430/522 |

*Primary Examiner*—Richard L. Schilling
*Attorney, Agent, or Firm*—Breiner & Breiner

[57] ABSTRACT

A new class of dyes useful in photographic materials as antihalation dyes, filter dyes or acutance dyes is disclosed. The dyes absorb in the spectral region 450–500 nm and are especially useful in photographic materials designed for recording by means of an Ar ion laser.

5 Claims, No Drawings

CLASS OF YELLOW DYES FOR USE IN PHOTOGRAPHIC MATERIALS

DESCRIPTION

Benefit is claimed from U.S. Provisional Appliation Serial No. 60/007,974 filed Dec. 5, 1995, abandoned.

1. Field of the Invention

The present invention relates to a new type of yellow dye and to photographic materials containing this new type of dye.

2. Background of the Invention

Light-absorbing dyes incorporated in silver halide photographic materials can accomplish a variety of goals, including their use as filter dyes, acutance dyes or antihalation dyes.

When present in a non-photosensitive top layer or intermediate layer they typically serve as filter dyes eliminating an unwanted part of the light spectrum of the exposure source. A well-known example is the yellow filter layer usually present in colour photographic materials in order to prevent blue light from reaching the green sensitive and red sensitive layers. Another example is formed by UV-absorbing compounds, usually present in the top protective layer, which prevent photochemical deterioration of the image dyes formed by colour development. Examples of useful UV-absorbers include the cyanomethyl sulfone-derived merocyanines of U.S. Pat. No. 3,723,154, the thiazolidones, benzotriazoles and thiazolothiazoles of U.S. Pat. Nos. 2,739,888, 3,253,921, 3,250,617 and 2,739,971, the triazoles of U.S. Pat. No. 3,004,896, and the hemioxonols of U.S. Pat. No. 3,125,597.

On the other hand light-absorbing dyes when present in the emulsion layer can serve as so-called "acutance dyes" or "screening dyes" improving the image sharpness by reducing the sidewise scattering of light by the emulsion grains.

In a third application light-absorbing dyes act as "antihalation dyes" improving the image sharpness by diminishing the upward reflection of light by the support into the emulsion layer. For this purpose the dye can be incorporated in an undercoat, being a non-photosensitive layer between the emulsion layer and the support, or it can be incorporated in the base itself, or it can be present in one or more backing layers of the photographic material.

Useful dyes absorbing in the visible spectral region include, for instance, the coloured pigments of U.S. Pat. No. 2,697,037, the pyrazolone oxonol dyes of U.S. Pat. No. 2,274,782, the styryl and butadienyl dyes of U.S. Pat. No. 3,423,207, the diaryl azo dyes of U.S. Pat. No. 2,956,879, the merocyanine dyes of U.S. Pat. No. 2,527,583, the merocyanine and oxonol dyes of U.S. Pat. No. 3,486,897, U.S. Pat. Nos. 3,652,284 and 3,718,472, and the enaminohemioxonol dyes of U.S. Pat. No. 3,976,661.

The dyes incorporated in one or more particular hydrophilic layers of a photographic material may be water-soluble. In this case they are easy diffusible to adjacent layers during coating and drying. For some particular applications, e.g. when serving as antihalation dyes in a sublayer or subcoat positioned between emulsion layer and support, the dyes are preferably non-diffusible in order to retain a maximal concentration and density in said subcoat. By this is meant non-diffusible under normal coating conditons the pH of the coating solution being neutral or slightly acid depending on the isoelectric point of the gelatin used and the chemical nature of the dye. Under alkaline processing conditions the dye may become diffusable and/or may discolor. Such dyes can be incorporated in layers of photographic materials as dispersions or as so-called microcrystalline solid particles. Non-diffusible or hardly diffusible dyes of this type are described in e.g. U.S. Pat. No. 4,092,168, EP 0 274 723, EP 0 276 566, EP 0 276 566, EP 0 294 461, EP 0 299 435, GB 1,563,809, EP 0 015 601, U.S. Pat. No. 4,857,446, JP-A 02-259752, JP-A 02-264247, EP 0 582 753 and EP 0 587 229. A survey can be found in JP-A's 03-24539, 03-4223, 02-9350, 02-282240 and 03-1133.

In U.S. Pat. No. 4,857,446, cited above, dyes are disclosed having a 2-pyrazoline-5-one nucleus, free of carboxyl substituent but bearing a carboxyphenyl or sulphonamidophenyl substituent, and linked by one or two methin groups to a dialkylaminophenyl group. Excellent yellow dyes belong to this class.

JP-A 31-10578 discloses a.o. dyes comprising a pyrazoline-5-one nucleus bearing in the $4^e$ position a dialkylaminobenzylidene group and in the $3^e$ position a substituent comprising an amido group —CONH— and a carboxylic acid group.

JP-A 3-216646 describes dyes comprising a pyrazoline-5-one nucleus bearing in the $3^e$ position a substituent containing a bezoic acid group.

In graphic arts photographic scan materials and image-setting materials are commercialized which are designed for exposure by an apparatus equiped with an Ar ion laser emitting at 488 nm. An example is scan film S712p marketed by Agfa-Gevaert N.V. It will be clear that suitable antihalation-, filter- or acutance dyes for such films ought to show an absorption maximum in the region 450–500 nm, preferably as close as possible to 488 nm.

It is an object of the present invention to provide a new class of yellow-orange dyes absorbing in the region 450–500 nm.

It is a further object of the present invention to provide dyes which are resistant to diffusion under normal coating conditions, but decolorize easily leaving no objectional stain after procesing.

Other objects of the present invention will become clear from the description hereinafter.

SUMMARY OF THE INVENTION

The objects of the present invention are realized by providing a photographic material containing at least one silver halide emulsion layer and optionally one or more non-light sensitive layer(s) characterized in that at least one of those layers contains a dye represented by general formula (I):

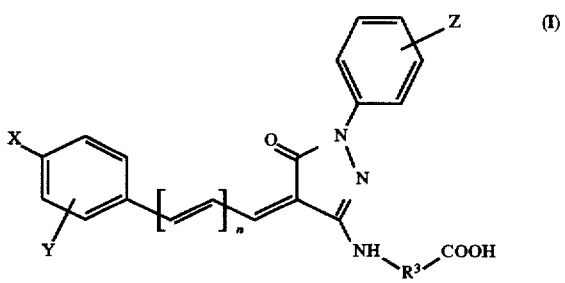

wherein,

X represents —N($R^1R^2$) or —OH, wherein each of $R^1$ and $R^2$ represents substituted or unsubstituted alkyl or aryl, or the necessary atoms to form a fused-on aromatic ring, each of Y and Z independently represents hydrogen or one or more substituent(s), R³ represents alkylene, which may be substituted, and n=0 or 1.

DETAILED DESCRIPTION OF THE INVENTION

The general method of the synthesis of the yellow dyes of the present invention is as follows. 1-phenyl-3-amino-pyrazoline-5-one is commercially available. The amino-group can be exchanged with an amino acid residue so that a carboxylic acid group is built in. This intermediate product then reacts with an aldehyde derived from a dialkylaniline or from phenol. An example is following reaction scheme:

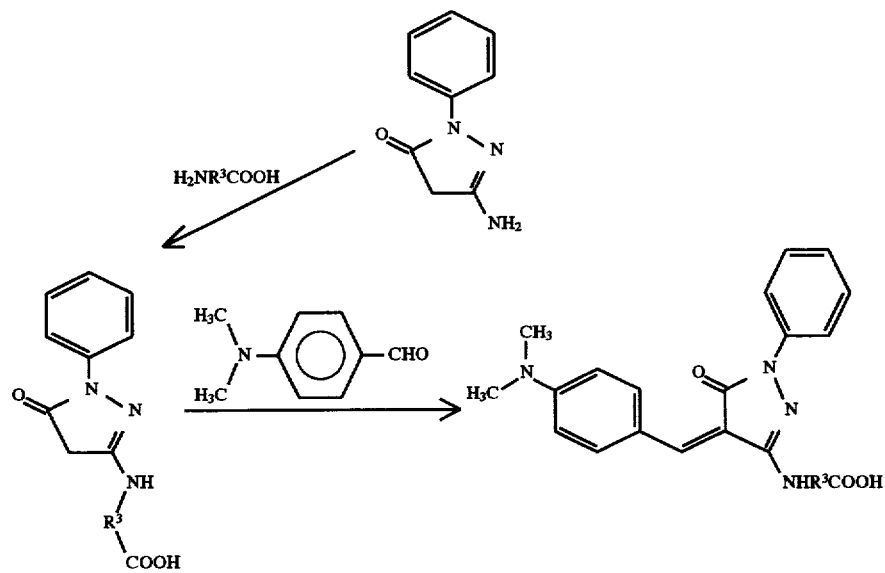

A non-limitative list of useful dyes in accordance with the present invention is illustrated in following table 1.

TABLE 1

| Dye No. | X | n | R³ | Z |
|---|---|---|---|---|
| D1 | N(C₂H₅)₂ | 0 | —CH₂— | — |
| D2 | N(CH₃)₂ | 0 | —CH₂— | — |
| D3 | N(CH₃)₂ | 1 | —CH₂— | — |
| D4 | N(CH₃)₂ | 0 | —CH(CH₃)— | — |
| D5 | N(CH₃)₂ | 0 | —CH[CH(CH₃)₂]— | — |
| D6 | N(CH₃)₂ | 0 | —CH₂— | p.-COOH |

Dependent on their particular application the invention dyes are incorporated in the emulsion layer or in a non-light sensitive layer. When serving as antihalation dyes they can be incorporated in a subcoat positioned between emulsion layer and support, or in a backing layer. When used as filter dyes they will be present in a layer positioned above the emulsion layer, preferably in the protective top layer. Finally, when serving as acutance dyes they are incorporated in the emulsion layer itself. Preferably they are incorporated in such an amount per m² that an optical density ranging between 0.1 and 1.5 in that particular layer is obtained.

For most purposes the application of only one particular invention dye will be sufficient but, in principle, a mixture of two or more dyes can be applied.

The emulsion or mixture of emulsions of the photographic material in connection with the present invention can be incorporated in one single layer but, alternatively, a double emulsion layer or even a multiple layer pack can be applied.

The halide composition of the silver halide emulsions used in accordance with the present invention is not specifically limited and may be any composition selected from e.g. silver chloride, silver bromide, silver iodide, silver chlorobromide, silver bromoiodide, and silver chlorobromoiodide.

The photographic emulsion(s) can be prepared from soluble silver salts and soluble halides according to different methods as described e.g. by P. Glafkidés in "Chimie et Physique Photographique", Paul Montel, Paris (1967), by G. F. Duffin in "Photographic Emulsion Chemistry", The Focal Press, London (1966), and by V. L. Zelikman et al in "Making and Coating Photographic Emulsion", The Focal Press, London (1966). They can be prepared by mixing the halide and silver solutions in partially or fully controlled conditions of temperature, concentrations, sequence of addition, and rates of addition. The silver halide can be precipitated according to the single-jet method, the double-jet method, the conversion method or an alternation of these different methods.

The silver halide particles of the photographic emulsion (s) may have a regular crystalline form such as a cubic or octahedral form or they may have a transition form. They may also have an irregular crystalline form such as a spherical form or a tabular form, or may otherwise have a composite crystal form comprising a mixture of said regular and irregular crystalline forms.

The silver halide grains may have a multilayered grain structure. According to a simple embodiment the grains may comprise a core and a shell, which may have different halide compositions and/or may have undergone different modifications such as the addition of dopes. Besides having a differently composed core and shell the silver halide grains may also comprise different phases inbetween.

Two or more types of silver halide emulsions that have been prepared differently can be mixed for forming a photographic emulsion for use in accordance with the present invention.

The average size of the silver halide grains may range from 0.05 to 1.0 micron, preferably from 0.2 to 0.5 micron. The size distribution of the silver halide particles can be homodisperse or heterodisperse.

The silver halide crystals can be doped with $Rh^{3+}$, $Ir^{4+}$, $Cd^{2+}$, $Zn^{2+}$ or $Pb^{2+}$.

The emulsion can be desalted in the usual ways e.g. by dialysis, by flocculation and re-dispersing, or by ultrafiltration.

The light-sensitive silver halide emulsions are preferably chemically sensitized as described e.g. in the above-mentioned "Chimie et Physique Photographique" by P. Glafkidés in the above-mentioned "Photographic Emulsion Chemistry" by G. F. Duffin, in the above-mentioned "Making and Coating Photographic Emulsion" by V. L. Zelikman et al, and in "Die Grundlagen der Photographischen Prozesse mir Silberhalogeniden" edited by H. Frieser and published by Akademische Verlagsgesellschaft (1968). As described in said literature chemical sensitization can be carried out by effecting the ripening in the presence of small amounts of compounds containing sulphur e.g. thiosulphate, thiocyanate, thioureas, sulphites, mercapto compounds, and rhodamines. The emulsions can be sensitized also by means of gold-sulphur ripehers or by means of reductors e.g. tin compounds as described in GB 789,823, amines, hydrazine derivatives, formamidine-sulphinic acids, and silane compounds. Chemical sensitization can also be performed with small amounts of Ir, Rh, Ru, Pb, Cd, Hg, Tl, Pd, Pt, or Au. One of these chemical sensitization methods or a combination thereof can be used.

The light-sensitive silver halide emulsions can be spectrally sensitized with methine dyes such as those described by F. M. Hamer in "The Cyanine Dyes and Related Compounds", 1964, John Wiley & Sons. Dyes that can be used for the purpose of spectral sensitization include cyanine dyes, merocyanine dyes, complex cyanine dyes, complex merocyanine dyes, hemicyanine dyes, styryl dyes and hemioxonol dyes. Particularly valuable dyes are those belonging to the cyanine dyes, merocyanine dyes and complex merocyanine dyes.

The silver halide emulsion(s) for use in accordance with the present invention may comprise compounds preventing the formation of fog or stabilizing the photographic characteristics during the production or storage of photographic elements or during the photographic treatment thereof. Many known compounds can be added as fog-inhibiting agent or stabilizer to the silver halide emulsion. Suitable examples are e.g. the heterocyclic nitrogen-containing compounds such as benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, mercaptotetrazoles, mercaptopyrimidines, mercaptotriazines, benzothiazoline-2-thione, oxazoline-thione, triazaindenes, tetrazaindenes and pentazaindenes, especially those described by Birr in Z. Wiss. Phot. 47 (1952), pages 2–58, triazolopyrimidines such as those described in GB 1,203,757, GB 1,209,146, JA-Appl. 75-39537, and GB 1,500,278, and 7-hydroxy-s-triazolo-[1,5-a]-pyrimidines as described in U.S. Pat. No. 4,727,017, and other compounds such as benzenethiosulphonic acid, benzenethiosulphinic acid and benzenethiosulphonic acid amide. Other compounds that can be used as fog-inhibiting compounds are metal salts such as e.g. mercury or cadmium salts and the compounds described in Research Disclosure N° 17643 (1978), Chapter VI.

The fog-inhibiting agents or stabilizers can be added to the silver halide emulsion prior to, during, or after the ripening thereof and mixtures of two or more of these compounds can be used.

Besides the silver halide another essential component of a light-sensitive emulsion layer is the binder. The binder is a hydrophilic colloid, preferably gelatin. Gelatin can, however, be replaced in part or integrally by synthetic, semi-synthetic, or natural polymers. Synthetic substitutes for gelatin are e.g. polyvinyl alcohol, poly-N-vinyl pyrrolidone, polyvinyl imidazole, polyvinyl pyrazole, polyacrylamide, polyacrylic acid, and derivatives thereof, in particular copolymers thereof. Natural substitutes for gelatin are e.g. other proteins such as zein, albumin and casein, cellulose, saccharides, starch, and alginates. In general, the semi-synthetic substitutes for gelatin are modified natural products e.g. gelatin derivatives obtained by conversion of gelatin with alkylating or acylating agents or by grafting of polymerizable monomers on gelatin, and cellulose derivatives such as hydroxyalkyl cellulose, carboxymethyl cellulose, phthaloyl cellulose, and cellulose sulphates.

The binders of the photographic element, especially when the binder used is gelatin, can be hardened with appropriate hardening agents such as those of the epoxide type, those of the ethylenimine type, those of the vinylsulfone type e.g. 1,3-vinylsulphonyl-2-propanol, chromium salts e.g. chromium acetate and chromium alum, aldehydes e.g. formaldehyde, glyoxal, and glutaraldehyde, N-methylol compounds e.g. dimethylurea and methyloldimethylhydantoin, dioxan derivatives e.g. 2,3-dihydroxy-dioxan, active vinyl compounds e.g. 1,3,5-triacryloyl-hexahydro-s-triazine, active halogen compounds e.g. 2,4-dichloro-6-hydroxy-s-triazine, and mucohalogenic acids e.g. mucochloric acid and mucophenoxychloric acid. These hardeners can be used alone or in combination. The binders can also be hardened with fast-reacting hardeners such as carbamoylpyridinium salts as disclosed in U.S. Pat. No. 4,063,952.

As already mentioned, beside the light-sensitive emulsion layer(s) the photographic material can contain several non-light sensitive layers, e.g. a protective top layer, one or more backing layers, and one or more intermediate or subcoat layers.

The photographic material of the present invention may further comprise various kinds of surface-active agents in the photographic emulsion layer or in another hydrophilic colloid layer. Suitable surface-active agents include non-ionic agents such as saponins, alkylene oxides e.g. polyethylene glycol, polyethylene glycol/polypropylene glycol condensation products, polyethylene glycol alkyl ethers or polyethylene glycol alkylaryl ethers, polyethylene glycol esters, polyethylene glycol sorbitan esters, polyalkylene glycol alkylamines or alkylamides, silicone-polyethylene oxide adducts, glycidol derivatives, fatty acid esters of polyhydric alcohols and alkyl esters of saccharides; anionic agents comprising an acid group such as a carboxy, sulpho, phospho, sulphuric or phosphoric ester group; ampholytic agents such as aminoacids, aminoalkyl sulphonic acids, aminoalkyl sulphates or phosphates, alkyl betaines, and amine-N-oxides; and cationic agents such as alkylamine salts, aliphatic, aromatic, or heterocyclic quaternary ammonium salts, aliphatic or heterocyclic ring-containing phosphonium or sulphonium salts. Such surface-active agents can be used for various purposes e.g. as coating aids, as compounds preventing electric charges, as compounds improving slidability, as compounds facilitating dispersive emulsification, as compounds preventing or reducing adhesion, and as compounds improving the photographic characteristics e.g higher contrast, sensitization, and development acceleration. Preferred surface-active coating agents are compounds containing perfluorinated alkyl groups.

Apart from the light-absorbing dye(s) and the sensitizing dye(s) a so-called "recognition dye" can be present, preferably in a backing layer. Such a dye exerts no photographic activity but enhances the visual difference under faint dark room illumination between the emulsion layer side and the backing layer side.

The photographic elements in connection with the present invention may further comprise various other additives such as e.g. compounds improving the dimensional stability of the photographic element, spacing agents and plasticizers.

The support of the photographic materials in connection with the present invention can be transparent base, preferably an organic resin support, e.g. cellulose nitrate film, cellulose acetate film, polyvinylacetal film, polystyrene film, polyethylene terephthalate film, polycarbonate film, polyvinylchloride film or poly-Alpha-olefin films such as polyethylene or polypropylene film. The thickness of such organic resin film is preferably comprised between 0.07 and 0.35 mm. These organic resin supports are preferably coated with a subbing layer.

The photographic materials according to the invention can be processed by any means or any chemicals known in the art depending on their particular application. In the case of blue sensitive elements in the field of recording they are preferably processed in so-called "Rapid Access" chemicals, comprising a conventional Phenidone/hydroquinone developing solution and a conventional sodium or ammonium thiosulphate containing fixing solution. The development time is usually between 10 and 30 seconds at a temperature of about 35° C. They can also be processed in an ecological developer containing an ascorbic acid derivative and optionally Phenidone or a p-aminophenol derivative as auxiliary developer. Alternatively they can be processed in so-called "hard dot Rapid Access" chemistry, e.g. the AGFASTAR system marketed by Agfa-Gevaert N.V. Preferably an automatically operated processor provided with automatic regeneration is used, e.g. a RAPILINE device marketed by Agfa-Gevaert N.V.

The present invention is illustrated by the following examples without however being limited thereto.

EXAMPLES

Preparative Example 1

Synthesis of Dye D2

Equivalent amounts of starting compound (A) V602500 and of starting compound (B) V600175 were boiled together under reflux in acetic acid for 18 hours. After cooling of the reaction mixture the precipitate formed was filtered off and washed with distilled water. The yield of intermediate compound (C) was 36%.

Compound (C) was dissolved in a sodium hydroxide solution (4 equivalents) at 50° C. Then 6 equivalents of hydrochloric acid were added. After cooling of the reaction mixture the precipitate formed was filtered off and washed with distilled water. The yield of intermediate compound (D) was 89%.

Compound (D) was boiled under reflux in ethanol with a excess of a compound (E) for 2 hours. The reaction product formed was precipitated by means of distilled water giving rise to an impure precipitate. The dye D2 was isolated by purification by means of preparative column chromatography. The yield was 36%.

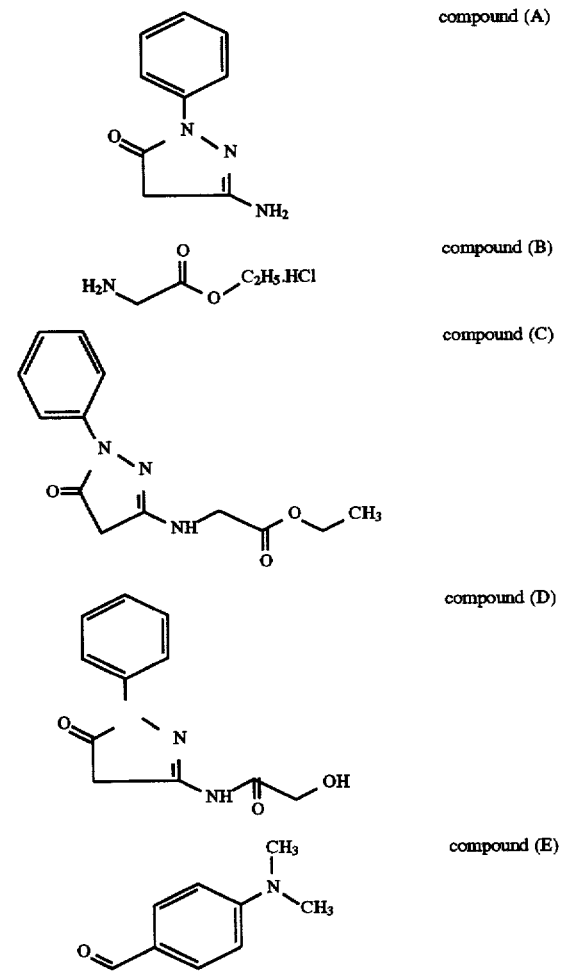

Preparative Example 2

Preparation of Dye D4

Equivalent amounts of starting compound (A) and of starting compound (F) were boiled under reflux in acetic acid for 16 hours. After extraction of the reaction mixture with water-methylenechloride (1:1) and concentration by evaporation of the methylenechloride an impure precipitate (intermediate compound (G)) was obtained. The yield was 83%.

The impure compound (G) was dissolved by heating in a sodium hydroxide solution. After addition of an excess of hydrochloric acid (4 equivalents) the precipitate formed (intermediate compound (H)) was filtered off and dried.

Compound (H) was boiled under reflux with an excess of compound (E) in ethanol for 3 hours. Then the reaction mixture was concentrated by evaporation. Two compounds, being dye D4 and a side product (I), were isolated by means of preparative column chromatography.

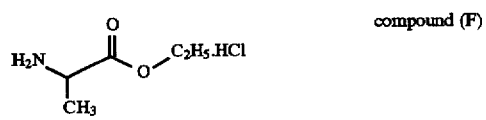

-continued compound (G)

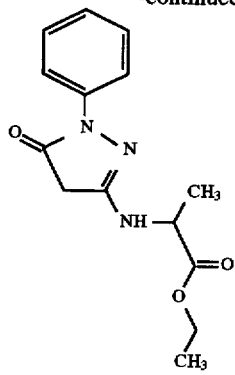

compound (H)

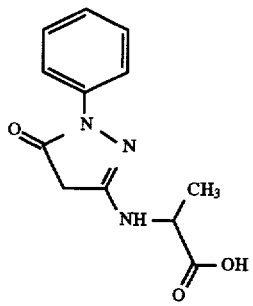

compound (I)

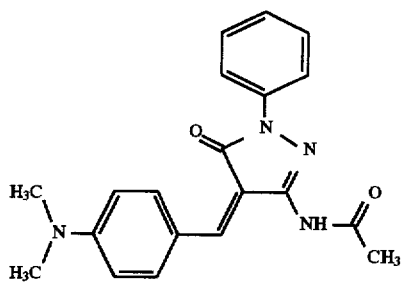

photographic example

The dyes were incorporated in a non-light sensitive gelatinous layer as 5% gelatinous dispersions. Each layer was coated at a dry coverage of 2 g of gelatin/m², and 200 mg dye/m². Absorption spectra were recorded. The optical densities at the wavelength of maximal absorption and at the emission wavelength of an Ar ion laser are illustrated in table 2. Furtheron the resistance to diffusion was determined as the difference in density untreated and after 30 s dipping in water, and expressed percentually.

TABLE 2

| Dye | resistance to diffusion | $l_{max}$ | $D(l_{max})$ | D(488 nm) |
|-----|----|-----|------|------|
| D1 | 84% | 460 | 0.48 | 0.30 |
| D2 | 43% | 460 | 0.48 | 0.37 |
| D3 | 91% | 490 | 0.60 | 0.60 |
| D4 | 89% | 460 | 0.19 | 0.15 |
| D5 | 75% | 450 | 0.70 | 0.35 |

It is clear from table 2 that dye 3 is the most interesting compound.

We claim:

1. Photographic material containing at least one silver halide emulsion layer and optionally one or more non-light sensitive layer(s) characterized in that at least one of those layers contains a dye represented by general formula (I):

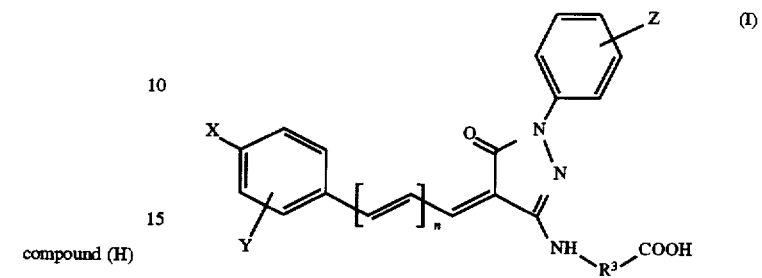

wherein,

X represents —N(R¹R²) or —OH, wherein each of R¹ and R² represents substituted or unsubstituted alkyl or aryl, or the necessary atoms to form a fused-on aromatic ring, each of Y and Z independently represents hydrogen or one or more substituent(s), R³ represents alkylene, which may be substituted, and n=0 or 1.

2. Photographic material according to claim 1 wherein said photographic material includes a support and wherein said photographic material further includes an antihalation dye and said dye serves as said antihalation dye which is incorporated in a backing layer or in a hydrophilic layer positioned between said support and said emulsion layer.

3. Photographic material according to claim 1 wherein said photographic material includes a top layer above said emulsion layer and wherein said dye serves as a filter dye which is incorporated in said layer positioned above said emulsion layer.

4. Photographic material according to claim 1 wherein said yellow dye serves as an acutance dye and is incorporated in an emulsion layer.

5. Photographic material according to claim 1 wherein said dye is following compound:

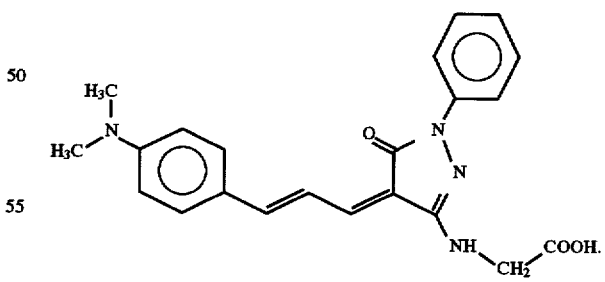

* * * * *